(12) United States Patent
Everson et al.

(10) Patent No.: US 7,768,998 B1
(45) Date of Patent: Aug. 3, 2010

(54) DYNAMIC VOIP CODEC SELECTION BASED ON LINK ATTRIBUTES AT CALL SETUP

(75) Inventors: John Everson, Kansas City, MO (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1218 days.

(21) Appl. No.: 11/151,362

(22) Filed: Jun. 13, 2005

(51) Int. Cl.
*H04L 12/66* (2006.01)
*H04J 3/16* (2006.01)

(52) U.S. Cl. ...................... 370/352; 370/468

(58) Field of Classification Search ................ 370/235, 370/329, 392, 468, 503, 238, 252–256, 352, 370/465
See application file for complete search history.

(56) References Cited

U.S. PATENT DOCUMENTS

| | | | |
|---|---|---|---|
| 6,798,786 B1 * | 9/2004 | Lo et al. ...................... 370/468 |
| 7,002,992 B1 * | 2/2006 | Shaffer et al. ................ 370/468 |
| 7,263,095 B1 * | 8/2007 | Sarkar ......................... 370/352 |
| 2001/0008556 A1 | 7/2001 | Bauer et al. |
| 2002/0156903 A1 | 10/2002 | Bach Corneliussen |
| 2003/0012137 A1 | 1/2003 | Abdelilah et al. |
| 2003/0012138 A1 | 1/2003 | Abdelilah et al. |
| 2003/0016630 A1 | 1/2003 | Vega-Garcia et al. |
| 2003/0115332 A1 | 6/2003 | Honeisen |
| 2004/0047437 A1 * | 3/2004 | Hamiti et al. ................ 375/326 |
| 2004/0203802 A1 | 10/2004 | McCormick et al. |
| 2004/0213257 A1 | 10/2004 | Abdelilah et al. |
| 2004/0240399 A1 | 12/2004 | Corrao et al. |
| 2005/0201414 A1 * | 9/2005 | Awais ......................... 370/468 |
| 2005/0286496 A1 * | 12/2005 | Malhotra et al. ............ 370/352 |
| 2006/0256721 A1 * | 11/2006 | Yarlagadda et al. ......... 370/235 |
| 2007/0195749 A1 * | 8/2007 | Kakimoto ................... 370/352 |

* cited by examiner

*Primary Examiner*—Fan Tsang
*Assistant Examiner*—Solomon Bezuayehu

(57) ABSTRACT

A VoIP call signaling method including a codec selection mechanism that measures the effective data transmission rate and other network characteristics. In some embodiments, a proxy performs a network test between itself and both end terminals to quantify the quality of the link before notifying both of the endpoints the optimal codec they should use for a peer-to-peer call. In alternative embodiments, the proxy informs the endpoints of the network characteristics and allows the endpoints to negotiate the codec selection. The network test preferably identifies delay, bandwidth, jitter and packet loss rates.

13 Claims, 3 Drawing Sheets

DYNAMIC VOIP CODEC SELECTION BASED ON LINK ATTRIBUTES AT CALL SETUP

FIELD OF THE INVENTION

The present invention relates to telecommunications and, more particularly, to establishing VoIP codec parameters for use during a peer-to-peer VoIP session.

DESCRIPTION OF RELATED ART

To establish a peer-to-peer IP voice call, endpoint user devices typically engage in signaling with each other through one or more proxy servers (hereafter "proxy server"). By way of example, using industry standard SIP signaling, an initiating device may send a SIP "INVITE" message to the proxy server, with the message being addressed to a "SIP address" of another device. The proxy server may then use SIP registration data to map that SIP address to a routable IP address where the target device is currently located and may forward the message along to that IP address. If the target device agrees to participate in the call, it may then return a SIP "200 OK" message, which would pass through the proxy server and to the initiating device. The initiating device would then send a SIP "ACK" message to complete the call setup signaling, and the parties would then begin to engage in bearer communication, exchanging VoIP data with each other for instance.

Each IP telephony (VoIP) device uses voice coders and decoders (codecs) to facilitate exchange of voice between a user and a network. For example, upon receipt of analog voice from a user, a device may digitize the voice and then apply a codec to compress the resulting digital bit stream. The device may then packetize and transmit the compressed data in Real-time Transport Protocol (RTP) packets to the other end. At the other end, a device would receive the packets, strip, re-sequence, and re-assemble the payload, and apply the same codec to decode (e.g., decompress) the data. The decoded bit stream can then be converted to an analog form and played out to a user.

Codecs use various compression algorithms to reduce the amount of data that needs to be transmitted from one end to another. Typical codecs that are well known in the art include, for instance, G.711, G.726, and G.729. G.711 provides very good voice quality with very low compression and operates well at about 100 kbps. G.726 provides very good voice quality with moderate compression, operating well at about 50 kbps. And G.729 provides good voice quality with high compression at about 20 kbps.

A typical VoIP device can support multiple codecs and will use the highest bit rate codec available. In this regard, when devices work to set up a peer-to-peer VoIP session, the devices will typically negotiate during the call setup process to agree on use of a particular codec. As is well known in the art, for instance, SIP signaling can contain Session Description Protocol (SDP) headers that specify desired or acceptable session characteristics. An initiating device may include in its SIP INVITE message an SDP block that specifies a desired codec to be used, or perhaps a priority list of desired or acceptable codecs to use. When the target device receives the INVITE, the target device may then compare the specified codec(s) with the codec(s) that the target device supports. Upon finding a match (e.g., the highest bit rate matching codec, or the highest priority matching codec), the target device may include an indication of that agreed codec in its SIP 200 OK message. After the initiating device then sends a SIP ACK message, the endpoints may then begin exchanging voice data compressed with the agreed codec.

One deficiency of this codec selection process is that the devices may not have network connections that are able to support communication at the selected data rate or quality of service required for the selected codec. If either device has a network connection that cannot support the selected coded, the overall quality of the VoIP call will be degraded. Therefore, an improved codec selection mechanism is desired.

SUMMARY

The present invention provides an improved mechanism for selecting a codec when setting up a peer-to-peer VoIP communication session. In accordance with an exemplary embodiment, a proxy server that is in the call setup communication path between the parties will test or otherwise learn about the network link quality (e.g. delay, bandwidth, jitter and packet loss rates), between itself and each endpoint device and will qualify each link respectively. Based on that determined link quality, the proxy server may then select a codec for both endpoints to use and may instruct each endpoint to use the selected codec. Alternatively, the proxy server may inform each endpoint of the determined network link characteristics and may allow the endpoints themselves to use that link characteristic information as a basis to negotiate for use of an agreed codec.

In one respect, an exemplary embodiment of the invention may take the form of a method of establishing VoIP communication parameters. According to the method, a VoIP proxy server may receive a VoIP call initiation request from a first VoIP client device, where the VoIP call initiation request identifies a second VoIP client device. Further, through signaling that passes to or through the VoIP proxy server, the VoIP proxy server may receive voice codec preferences from both the first device and the second device and may select a set of voice codes that are common to both devices. In addition, the VoIP proxy server may determine connection (link) characteristics respectively between itself and the first device and between itself and the second device. In turn, the VoIP proxy server may then use those connection characteristics as a basis to select a codec from the set of common codecs, preferably such that the selected codec supports a desired level of voice quality.

In an alternative embodiment, after the VoIP proxy server receives the VoIP call initiation request, the VoIP proxy server may determine connection characteristics respectively for each device, and the VoIP proxy server may forward the determined connection characteristics to the devices. For instance, the VoIP proxy server may send the connection characteristics for the first device to the first device and the connection characteristics for the second device to the second device. The devices themselves may then use the determined connection characteristics as a basis to select one or more desired codecs, and they may then specify the selected codec(s) in further signaling exchanges. The devices or the VoIP proxy server may then select a best common codec (e.g., the highest priority or highest bit rate matching codec) to use for the call, preferably one that provides a desired level of voice quality.

These as well as other aspects, advantages, and alternatives will become apparent to those of ordinary skill in the art by

DETAILED DESCRIPTION OF EXEMPLARY EMBODIMENTS

Figure 1A:
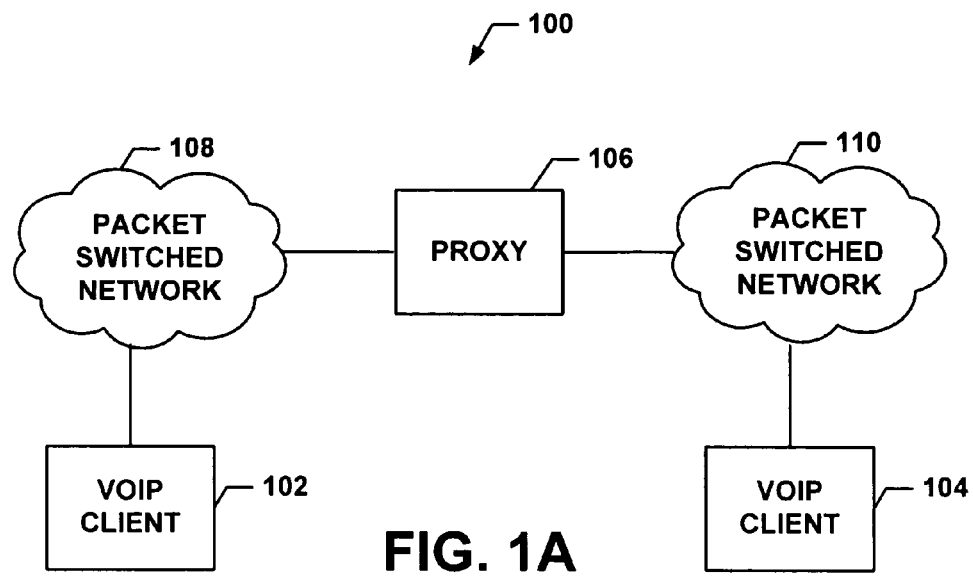
FIGS. 1A and 1B are block diagrams illustrating embodiments of a preferred VoIP communication system.
Figure 1B:
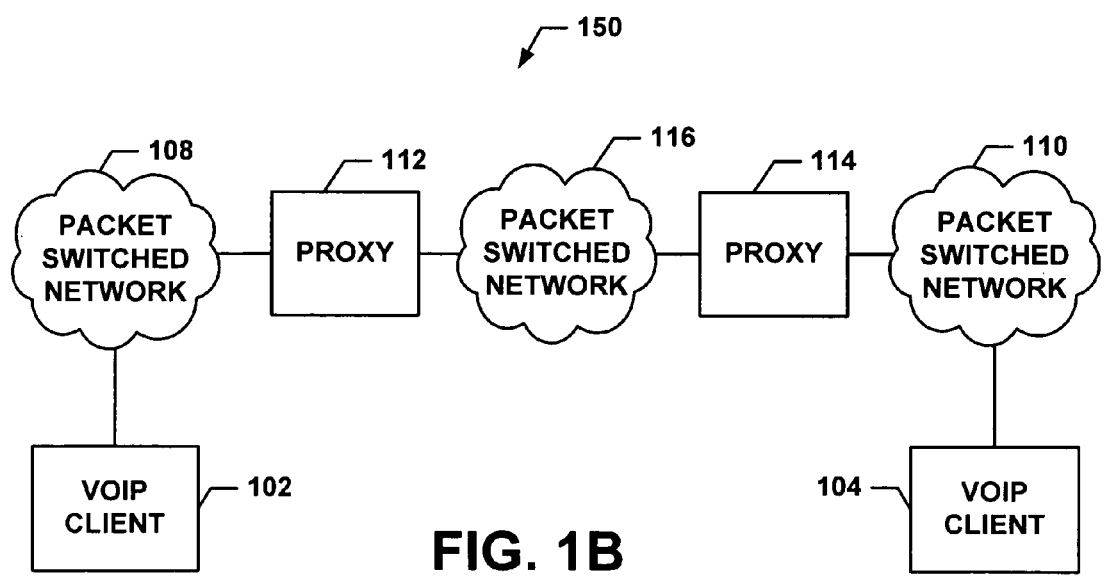

Referring to the drawings, FIGS. 1A and 1B depict example network arrangements for providing VoIP services between two endpoint VoIP devices 102, 104. It should be understood, of course, that these and other arrangements and functions shown or described herein are set forth for purposes of example only and that many variations are possible. For instance, elements or functions can be rearranged, added, omitted or otherwise modified. Further, network entities that are described as carrying out various functions can include one or more processors programmed with machine language instructions (program instructions) to carry out the functions and/or with firmware or hardware.

In the arrangement shown in FIG. 1A, both endpoint devices 102, 104 are coupled with a common VoIP proxy server 106, each via a respective communication link 108, 110. In the arrangement as shown, each communication link comprises a packet-switched network. In an alternative embodiment, however, the links may vary in form from each other, and either or both can take a form other than a packet-switched network. For instance, a suitable link could be a direct Ethernet or other type of connection. Further, a communication link between an endpoint device can include wireless and/or wired portions or can be entirely wired or wireless.

In the arrangement shown in FIG. 1B, on the other hand, each endpoint device is shown coupled with a respective proxy via a respective communication link. In particular, device 102 is coupled with a first proxy 112 via a first communication link 108, and device 104 is coupled with a second proxy 114 via a second communication link 110. The two proxies are then shown coupled by another communication link, shown by way of example as a common packet-switched network 116.

Each VoIP proxy server shown in these figures may take the form of one or more SIP servers, such as (i) a SIP registry function that maps SIP addresses to the IP addresses of devices where those SIP addresses are currently in use, and (ii) a SIP proxy function that operates to forward SIP messages to the IP addresses indicated by the SIP registration server. Thus, the SIP signaling that would be passed from one endpoint to another to set up a VoIP call would preferably pass through at least one such VoIP proxy server on its way.

With the arrangement of FIG. 1A, for instance, device 102 can set up a VoIP call with device 104 by engaging in SIP signaling via link 108, proxy 106, and link 110. And with the arrangement of FIG. 1B, for instance, device 102 can set up a VoIP call with device 104 by engaging in SIP signaling via link 108, proxy 112, link 116, proxy 114, and link 110. As described above, the initiating device 102 would send a SIP INVITE to the target device, the target device 104 would respond with a SIP 200 OK, and the initiating device would then complete setup of the session by sending a SIP ACK. Assuming the devices agreed on a voice codec to use, they could then commence voice communications.

In accordance with the preferred embodiment, as noted in the summary section above, one or more proxies, such as proxy 106 or proxies 112, 114 will determine connection characteristics respectively between itself and one or more of the endpoint devices. A proxy and/or an endpoint device may then use that determined connection characteristic information as a basis to select one or more codecs to use in the VoIP call being established. Although this process will preferably occur at the initiation of a VoIP call, the process can in theory be applied during a VoIP call as well, such as to select a new codec to use during the call.

Figure 2:
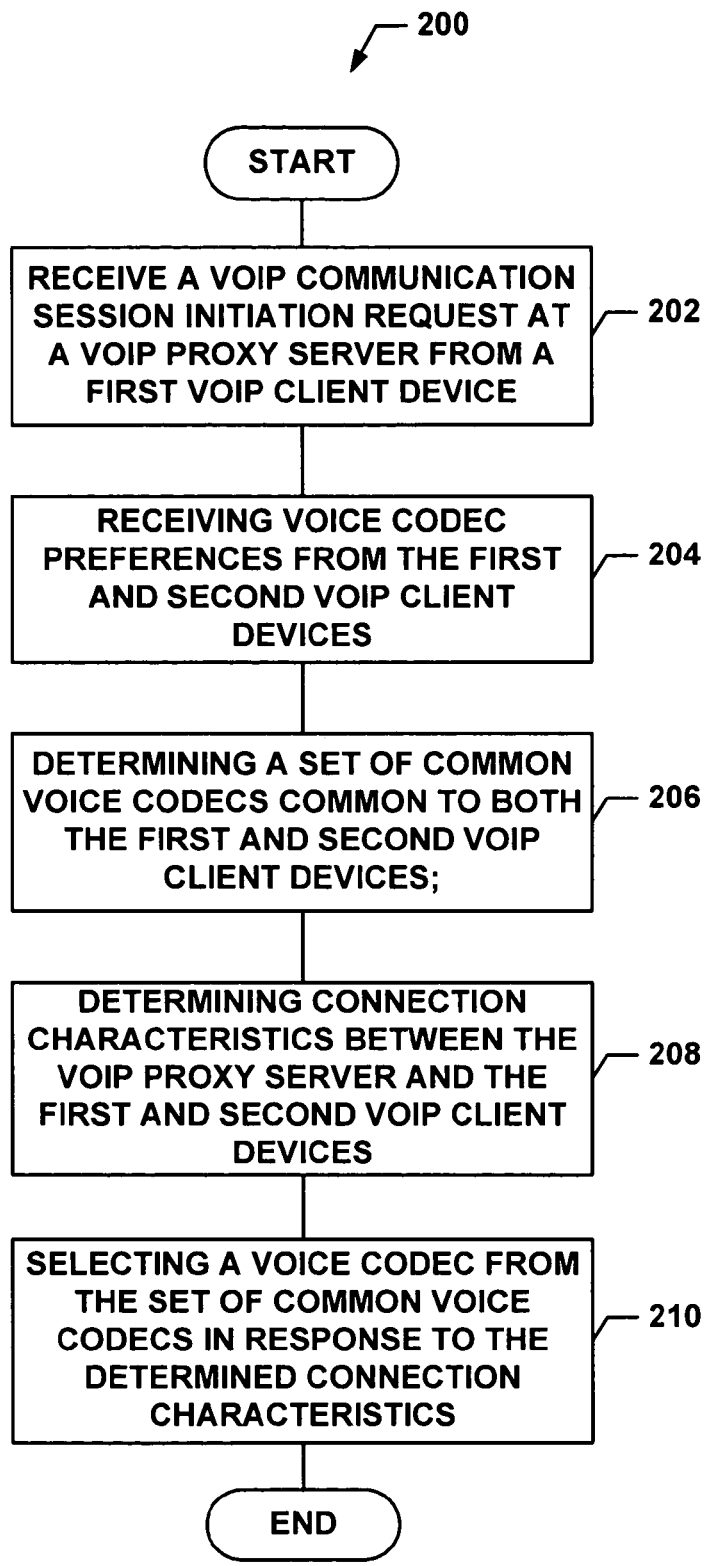
FIG. 2 illustrates a preferred method of determining a voice codec for use in a VoIP call.
Figure 3:
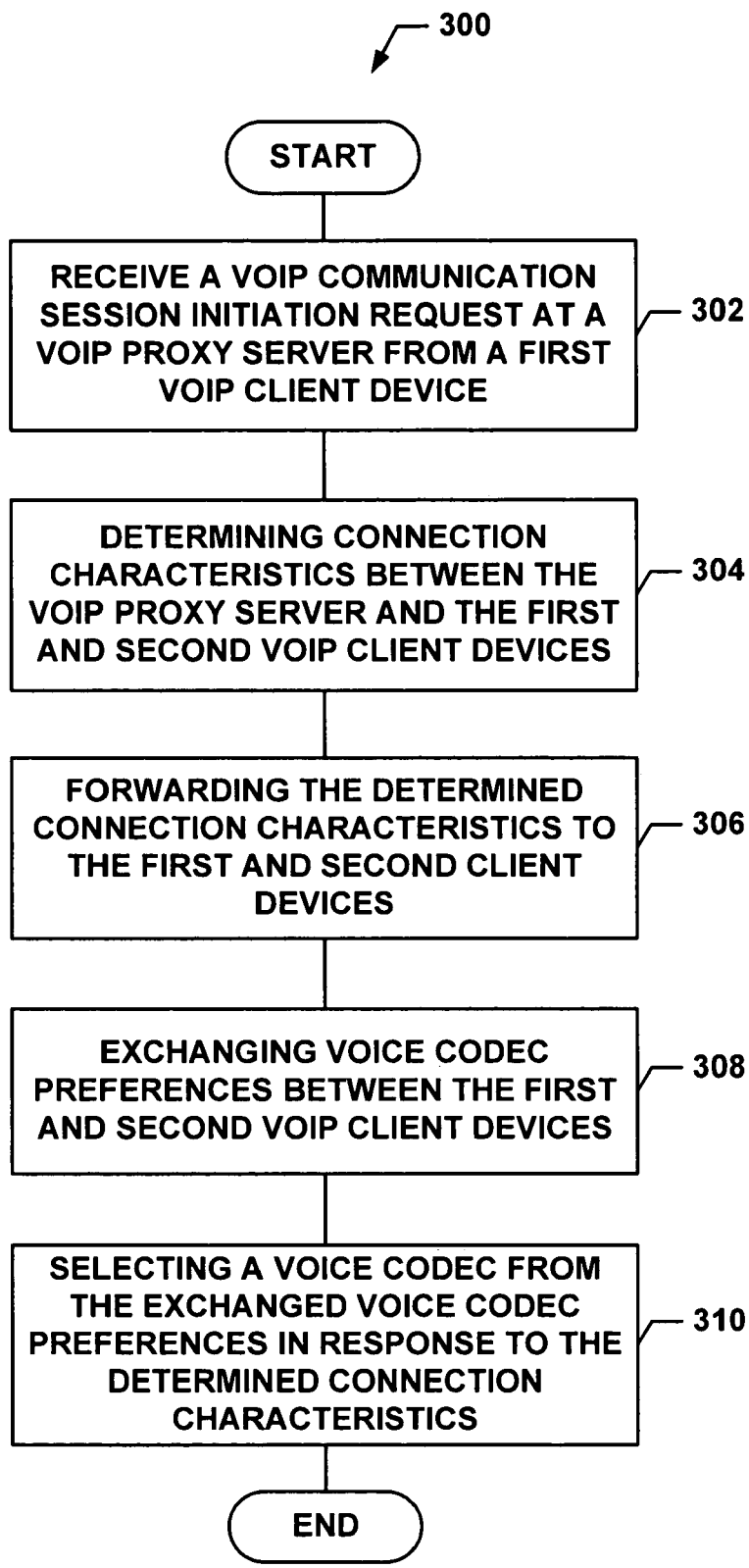
FIG. 3 illustrates another preferred method of determining a voice codec for use in a VoIP call.

FIGS. 2 and 3 are flow charts depicting functions that can be carried out in accordance with an exemplary embodiment of the invention. Referring first to FIG. 2, the depicted process begins at step 202, where a VoIP proxy server receives a VoIP call initiation request from a VoIP client device, or "calling" device, seeking to set up a call with a second VoIP client device, or "called" device. Preferably, the call initiation request will identify the calling device and will include information about the device, including the device's codec preferences. By way of example, the call initiation request can be a SIP INVITE message that specifies the calling device's codec preferences in an SDP block (one or more SDP headers).

The process of the VoIP proxy server receiving the VoIP call initiation request from the calling device preferably involves the VoIP server receiving the VoIP call initiation request as the request is being transmitted from the calling device to the called device. Thus, in addition to being received by the VoIP proxy server, the call initiation request will preferably also pass along to the called device. In response, if the called device is willing to participate in the session, the called device may return to the calling device an acceptance message, which includes information about the second device such as the device's codec preferences. Continuing with SIP as the example, the acceptance message can be a SIP 200 OK message that specifies the called device's codec preferences in an SDP block.

As shown at step 204 in FIG. 2, the VoIP proxy server may thus receive voice codec preferences from the first and second devices, or calling and called devices. Preferably, the voice codec preferences arrive at the VoIP proxy via SDP in the SIP signaling that the devices exchange with each other. Alternatively, however, other signaling can be provided between the devices and the VoIP proxy to specifically indicate codec preferences and/or for other purposes.

Note that a given device can specify its preferred codec(s) by specifically identifying the codec(s) and/or by specifying a voice-quality indicator, which may correlate with only one or more specific codecs. By way of example, the SDP block of the SIP INVITE message transmitted by the calling device can specify a preferred voice-quality level, as indicated by a user of the device or as a default device or application setting. The level could be, for instance, "high", "medium", or "low". Specification of a "low" voice-quality level may mean that any codec (of those supported by the device) is acceptable, specification of a "medium" voice-quality level may eliminate codecs such as than G.723.1, GSM, and LPC10, and specification of a "high" voice-quality level may eliminate other codecs such as G.711 for instance. (Of course, the specific mapping between voice-quality designations and codecs can take other forms.)

As shown next at step 206, the VoIP proxy server determines a set of common voice codecs, namely, the codecs that would be acceptable and/or preferred by both the calling and called devices. This function can take into account the codecs specifically indicated by the devices and those commensurate with indicated voice-quality levels, for instance.

At step 208, the VoIP proxy server next determines the connection characteristics, respectively, between itself and the calling and called devices. Preferably, the connection characteristics include throughput (bit rate), delay, jitter, and/or packet-loss measures. The VoIP proxy server can make these connection characteristic determinations in various ways. By way of example, the VoIP proxy server can ping each device a number of times to build a statistical measure of delay, jitter, and packet loss. As another example, the VoIP proxy server can send a sample packet stream to each endpoint, such as a predetermined form packet stream, and each endpoint device can be programmed to report how successfully (or unsuccessfully) it received the transmitted packets. The endpoint devices may for instance, engage in further SIP signaling or other types of signaling (e.g., Real-Time Control Protocol (RTCP) sender report or extended report (XR)) to convey transmission reports to the VoIP proxy server. Other methods can be used as well.

At step 210, the VoIP proxy next uses the determined connection characteristics as a basis to select a voice codec from the set of common voice codecs. Preferably, the selected voice codec will provide an estimated voice-quality level that is at or above a desired voice-quality level. In an exemplary embodiment, for example, each codec may have predetermined limits on connection characteristics, such as requirements that should be met for the codec to work best. For instance, a given codec might require at least a particular data throughput, and might not tolerate more than a particular level of delay, a particular level of jitter, and particular level of packet loss. Another codec may have other tolerances or requirements. The VoIP proxy server may maintain correlation data that correlates each codec with its required or tolerated connection characteristics. Thus, once the VoIP proxy server has determined the connection characteristics and knows the acceptable codecs for each endpoint, the VoIP server can determine based on the correlation data which of the codecs can be used.

Through this process, the VoIP proxy server will thereby select one or more common codecs (acceptable to both the calling and called parties) that can be appropriately used in light of the determined connection characteristics between both devices. If only one such codec exists, that is the codec to be used. On the other hand, if more than one such codec exists, the VoIP proxy server may then select for use whichever codec has the least amount of compression (but that will still operate within the determined connection characteristics for the two devices.)

As an alternative, this step can be carried out by comparing the determined connection characteristics with the set of minimum connection characteristics or tolerances per codec in a serial manner. For instance, the VoIP proxy server can test codecs in order from that with least compression to that with most compression, in search of a codec that can operate with the determined connection characteristics. The VoIP proxy server can then select the first codec that it finds in this manner.

In an exemplary embodiment, the VoIP proxy server will report the selected codec to the calling and called devices, so that the devices will use the selected codec in the VoIP call. One way that the VoIP proxy server can do this is to hold the called device's SIP 200 OK message until selection of the codec. Once the VoIP proxy server selects the codec, the VoIP proxy server can then tailor the SDP block of the 200 OK message to include just the selected codec. When that 200 OK message passes in turn to the calling device, the calling device would programmatically read the message and determine that the only codec the called device will use is the one specified, namely, the selected codec. The calling device may then specify that selected codec in the SIP ACK that it sends to the called device, or the VoIP proxy server may insert an indication of that codec into the SIP ACK passing from the calling device to the called device. Alternatively, other signaling can be used to convey the selected codec from the VoIP proxy server to the calling and called devices.

FIG. 3 next illustrates an alternative method that can be carried out in accordance with the exemplary embodiment. In FIG. 3, at step 302, the VoIP proxy server functions as in FIG. 2 to receive a VoIP call initiation request. At step 304, the VoIP proxy server then determines connection characteristics respectively between itself and the calling and called devices.

In this alternative embodiment, however, the VoIP proxy server may then forward the determined connection characteristics to the calling and/or called devices, so as to allow the devices themselves to negotiate on use of an acceptable codec. By way of example, after determining the connection characteristics between itself and the called device, the VoIP proxy server can specify those connection characteristics in the SIP INVITE that it forwards along to the called device. The called device can then use those connection characteristics as a basis to select one or more acceptable codecs, using a method like that described above with respect to the VoIP proxy server. Similarly, after determining the connection characteristics between itself and the calling device, the VoIP proxy server can specify those connection characteristics in the SIP 200 OK that it forwards along to the calling device. The calling device can then use those connection characteristics as a basis to revise its set of one or more acceptable codecs. After further signaling between the devices, the devices may then settle on a common codec to use during the VoIP call.

Note that combinations of these embodiments are also possible. For instance, the called device may receive connection characteristic information from the VoIP proxy server and may use the information as a basis to select a set of acceptable codecs to specify in its 200 OK message. The VoIP proxy server, on the other hand, may use connection characteristics with the calling device as a basis to determine which codecs can be used, and the VoIP proxy server may narrow the set of codecs specified in the 200 OK message down to just one codec in a manner similar to that described above. Other examples are possible as well.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of voice codec selection for a voice-over-IP (VoIP) call, the method comprising:

receiving into a proxy server a session initiation request transmitted via a first network link from a first VoIP device, wherein the initiation request seeks initiation of a VoIP call with a second VoIP device, and forwarding the session initiation request via a second network link from the proxy server to the second VoIP device;

receiving into the proxy server via the second network link from the second VoIP device a response to the session initiation request, and forwarding the response from the proxy server via the first network link to the first VoIP device;

the proxy server testing and thereby determining link quality of at least one of the first network link and the second network link; and the proxy server adding a specification of the proxy-determined link quality to at least one of the session initiation request being forwarded to the second VoIP device and the response being forwarded to the first VoIP device, to enable at least one of the first VoIP device and second VoIP device to tailor voice codec selection based on the specification of the proxy-determined link quality.

2. The method of claim 1, wherein the session initiation request comprises a Session Initiation Protocol (SIP) INVITE request, wherein the proxy server testing and thereby determining link quality of at least one of the first network link and the second network link comprises the proxy server testing and thereby determining link quality of the second network link; and wherein the proxy server adding the specification of the proxy-determined link quality to at least one of the session initiation request being forwarded to the second VoIP device and the response being forwarded to the first VoIP device comprises the proxy server adding to the SIP INVITE being forwarded to the second VoIP device a specification of the proxy-determined link quality of the second network link, so that the second VoIP device receives the specification of the proxy-determined link quality of the second network link when the second VoIP device receives the SIP INVITE, and so that the second VoIP device can then use the received specification of the proxy-determined link quality of the second network link as a basis to select one or more voice codecs acceptable for the second VoIP device for the VoIP call.

3. The method of claim 1, wherein the session initiation request comprises a Session Initiation Protocol (SIP) 200 OK message, wherein the proxy server testing and thereby determining link quality of at least one of the first network link and the second network link comprises the proxy server testing and thereby determining link quality of the first network link; and wherein the proxy server adding the specification of the proxy-determined link quality to at least one of the session initiation request being forwarded to the second VoIP device and the response being forwarded to the first VoIP device comprises the proxy server adding to the SIP 200 OK message being forwarded to the first VoIP device a specification of the proxy-determined link quality of the first network link, so that the first VoIP device receives the specification of the proxy-determined link quality of the first network link when the first VoIP device receives the SIP 200 OK message, and so that the first VoIP device can then use the received specification of the proxy-determined link quality of the first network link as a basis to select one or more voice codecs acceptable for the first VoIP device for the VoIP call.

4. A method of selecting a voice codec for use in a voice-over-IP (VoIP) call, the method comprising:

receiving into a proxy server a session initiation request transmitted via a first network link from a first VoIP device, wherein the initiation request seeks initiation of a VoIP call with a second VoIP device, and conveying the initiation request via a second network link to the second VoIP device;

at the proxy server, testing and thereby determining link quality of the first network link; and using the proxy-determined link quality of the first network link as a basis to select a voice codec for use by the first VoIP device and second VoIP device in the requested VoIP call, wherein using the proxy-determined link quality of the first network link as a basis to select the voice codec comprises: (i) the proxy server transmitting to the first VoIP device a specification of the proxy-determined link quality of the first network link, and (ii) the first VoIP device receiving the specification transmitted from the proxy server, and the first VoIP device selecting the voice codec based on the received proxy-determined link quality of the first network link.

5. A method of selecting a voice codec for use in a voice-over-IP (VoIP) call, the method comprising:

receiving into a proxy server a session initiation request transmitted via a first network link from a first VoIP device, wherein the initiation request seeks initiation of a VoIP call with a second VoIP device, and conveying the initiation request via a second network link to the second VoIP device;

at the proxy server, testing and thereby determining link quality of the first network link; and using the proxy-determined link quality of the first network link as a basis to select a voice codec for use by the first VoIP device and second VoIP device in the requested VoIP call, wherein using the proxy-determined link quality of the first network link as a basis to select the voice codec comprises: (i) the proxy server transmitting to the first VoIP device a specification of the proxy-determined link quality of the first network link, and (ii) the first VoIP device receiving the specification transmitted from the proxy server and selecting a set of possible voice codecs based on the proxy-determined link quality of the first network link, wherein the voice codec is then selected from the selected set of possible voice codecs.

6. The method of claim 4, wherein testing and thereby determining the link quality of the first network link at the proxy server comprises pinging the first VoIP device a number of times to determine a statistical measure of the link quality of the first network link.

7. The method of claim 4, wherein the link quality of the first network link comprises at least one quality metric selected from the group consisting of delay, jitter, and packet loss.

8. The method of claim 4, further comprising:

at the proxy server, testing and thereby determining link quality of the second network link; and using the proxy-determined link quality of the second network link as a further basis to select the voice codec for use by the first VoIP device and second VoIP device in the requested VoIP call.

9. The method of claim 8, wherein the link quality of the first network link comprises at least one quality metric selected from the group consisting of delay, jitter, and packet loss, and wherein the link quality of the second network link comprises at one quality metric selected from the group consisting of delay, jitter, and packet loss.

10. The method of claim 5, wherein testing and thereby determining the link quality of the first network link at the proxy server comprises pinging the first VoIP device a number of times to determine a statistical measure of the link quality of the first network link.

11. The method of claim 5, wherein the link quality of the first network link comprises at least one quality metric selected from the group consisting of delay, jitter, and packet loss.

12. The method of claim 5, further comprising:
at the proxy server, testing and thereby determining link quality of the second network link; and
using the proxy-determined link quality of the second network link as a further basis to select the voice codec for use by the first VoIP device and second VoIP device in the requested VoIP call.

13. The method of claim 12, wherein the link quality of the first network link comprises at least one quality metric selected from the group consisting of delay, jitter, and packet loss, and wherein the link quality of the second network link comprises at one quality metric selected from the group consisting of delay, jitter, and packet loss.

* * * * *